(12) United States Patent
Higuchi

(10) Patent No.: US 6,963,424 B1
(45) Date of Patent: Nov. 8, 2005

(54) PRINTING APPARATUS AND CALIBRATION CONTROL METHOD

(75) Inventor: Yuichi Higuchi, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 783 days.

(21) Appl. No.: 09/606,023

(22) Filed: Jun. 29, 2000

(30) Foreign Application Priority Data

Jul. 5, 1999 (JP) ................................. 11-190580

(51) Int. Cl.$^7$ ............................................. H04N 1/40
(52) U.S. Cl. ...................... 358/1.9; 358/406
(58) Field of Search ............... 358/1.9, 3.24, 358/1.15–1.16, 504, 406

(56) References Cited

U.S. PATENT DOCUMENTS

| | | | |
|---|---|---|---|
| 4,941,038 A | * 7/1990 | Walowit | ...... 358/518 |
| 5,579,090 A | 11/1996 | Sasanuma et al. | ...... 355/208 |
| 5,950,036 A | 9/1999 | Konishi | ...... 399/8 |
| 6,034,788 A | * 3/2000 | Sasanuma et al. | ...... 358/406 |
| 6,256,111 B1 | * 7/2001 | Rijavec | ...... 358/1.9 |

* cited by examiner

Primary Examiner—Thomas D. Lee
Assistant Examiner—Stephen Brinich
(74) Attorney, Agent, or Firm—Fitzpatrick, Cella, Harper & Scinto

(57) ABSTRACT

A calibration for the printing apparatus is performed under relatively easy management by a host computer and then the printing apparatus always can perform printing in a condition where an appropriate calibration is made for the printing apparatus. More specifically, the printer holds calibration data downloaded from the host computer and executes a density control (S1001) which generates calibration data at a predetermined timing independently in the printer. Then, the printer checks whether a difference between a print density value represented by the calibration data generated in the printer and a print density value represented by the calibration data held is greater than a predetermined threshold value (S1003). When the difference is greater than the predetermined value, the printer notifies an error (S1004) and sets a correction table based on the calibration data generated by the printer (S1006).

23 Claims, 12 Drawing Sheets

| COLOR \ INPUT DENSITY VALUE | DENSITY 1E | DENSITY 78 | DENSITY A0 | DENSITY FA |
|---|---|---|---|---|
| Y | 20 | 74 | A0 | FF |
| M | 22 | 78 | A5 | FF |
| C | 22 | 76 | A8 | FF |
| Bk | 22 | 80 | A5 | FF |

FIG.3

| COLOR | DENSITY 00 | DENSITY 0A | DENSITY 14 | DENSITY 1E | ......... | DENSITY FA |
|---|---|---|---|---|---|---|
| Y | 00 | 0B | 14 | 1C | ......... | FF |
| M | 00 | 0A | 16 | 1F | ......... | FF |
| C | 00 | 0A | 16 | 1E | ......... | FF |
| Bk | 00 | 09 | 16 | 1F | ......... | FF |

FIG.5

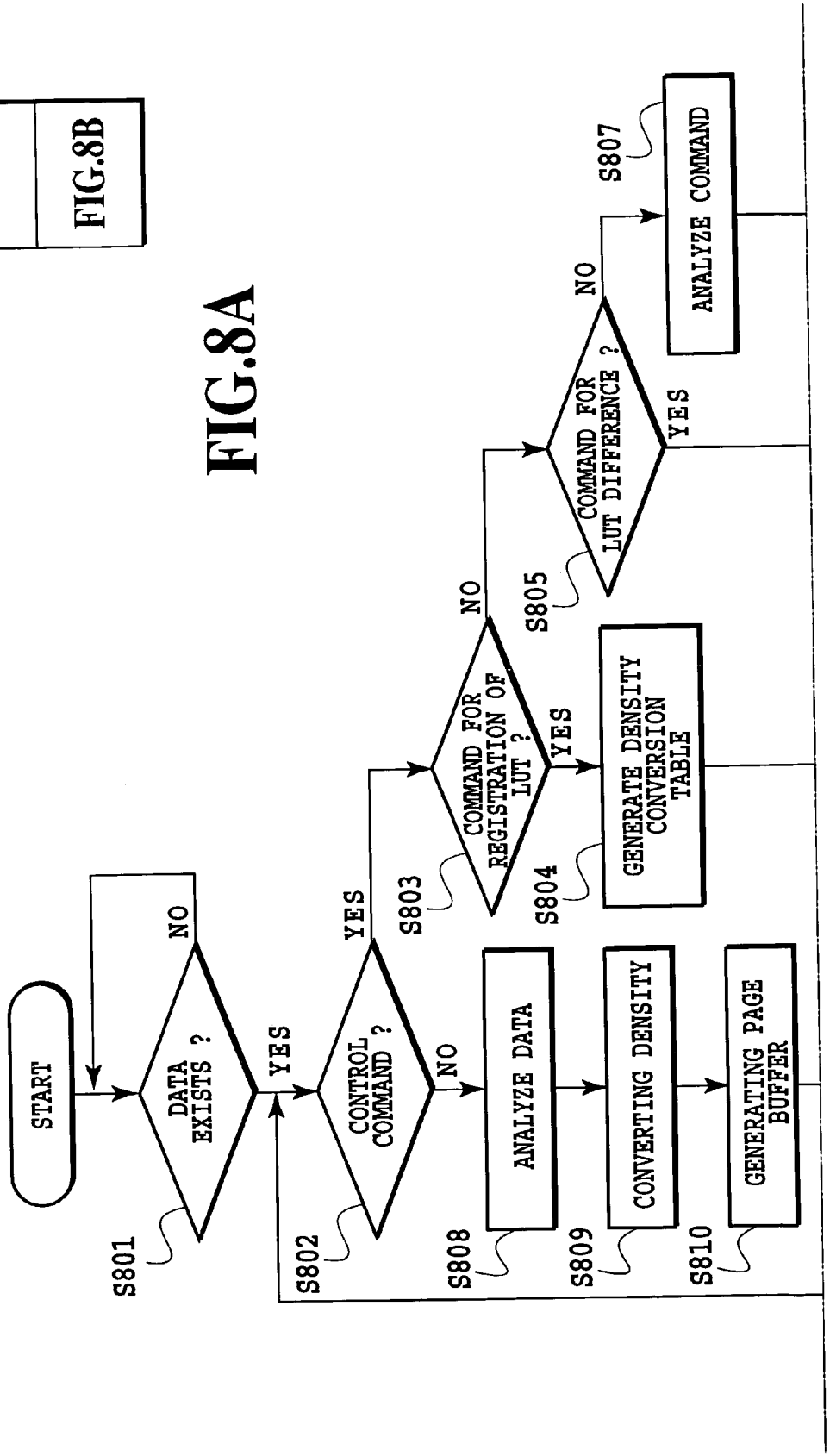

PRINTING APPARATUS AND CALIBRATION CONTROL METHOD

This application is based on Patent Application No. 11-190580 (1999) filed Jul. 5, 1999 in Japan, the content of which is incorporated hereinto by reference.

BACKGROUND OF THE INVENTION

1. Field of the Invention

The present invention relates to a printing apparatus and a calibration control method, and more specifically to controlling execution of a calibration that can cause a print characteristic of a printing apparatus to be a predetermined one.

2. Description of the Prior Art

A calibration for a printing apparatus, such as a printer, is normally performed in a form of updating of parameters used in image processing or other processing, such as output $\gamma$ correction. In more concrete terms, these processing are generally executed by using lookup tables (also referred to as "LUTs") and the calibration is done by updating the table data. To update the table data requires a series of processing including printing out of a predetermined image (e.g., a patch) by the printing apparatus to be calibrated and optically reading the printed image.

Ways in which the printer is used include a major way that the printer is used for performing printing based on print information, such as characters and images, sent from a host device such as a personal computer. Particularly, in recent years printers in an office or the like are often connected to a network to output print information generated by each of networked personal computers.

In such printing system, it is a most case that the calibration is performed as a procedure by the host device. When the calibration for $\gamma$ correction LUT, which is caused according to a command by the user, is performed, the host device first sends print data to the printer to print out patches that corresponds to a predetermined number of densities (gradation values), respectively. These patches are read by a scanner and, based on a result of reading and data of the predetermined number of densities, table data for updating the $\gamma$ correction LUT is generated.

The calibration data generated by the host device in this manner is used either by the host device or by the printing apparatus depending on a configuration of the printing system. More specifically, one of the configuration is that predetermined image processing including the $\gamma$ correction is performed by the host device and then the processed data is sent to the printing apparatus, and another of the configuration is that the image processing is performed by the printing apparatus. In the latter case, the calibration data is downloaded to the printing apparatus.

On the other hand, a printing apparatus, which performs the calibration independently, is also known. This calibration can be executed relatively easily, especially with the printing apparatus of an electro-photographic system. More specifically, the calibration is performed by forming a predetermined number of patch toner images on a transfer drum, for example, without printing the patches on a print paper, reading the toner images with a preinstalled optical sensor and, based on a result of reading, generating calibration data.

Such calibration in the printing apparatus is automatically performed when components such as a photosensitive drum are replaced or when environmental parameters such as temperature and humidity change by more than a predetermined amount.

Above-described manners in which the calibration is performed, however, have respective following drawbacks. The calibration performed mainly under the control by the host device requires reading the printed patches with a scanner, which may impose a burden on the user.

Further, execution of such calibration controlled by the host device is often started with an instruction by the user. In such case, it is relatively difficult that the calibration is performed at an appropriate timing, and therefore, even when a result of the calibration performed before no longer matches the printing characteristic of the printer, the old result may continue to be used. As a result of this, print quality may be degraded.

On the other hand, the calibration performed independently by the printing apparatus forms the patches on, for example, the transfer drum, so that a large number of patches cannot be formed. The calibration therefore cannot be performed as precisely as that performed by the host device.

As described above, the calibration performed by the host device and the calibration performed by the printer have respective advantages and drawbacks.

SUMMARY OF THE INVENTION

The object of the present invention is to provide a printing apparatus and a calibration control method capable of providing a calibration system that incorporates advantages of both of the calibrations done by the host device and the printing apparatus.

Another object of the present invention is to provide a printing apparatus and a calibration control method capable of making it easy to manage the execution of the calibration.

In a first aspect of the present invention, there is provided a printing apparatus capable of performing a calibration for a print characteristic, comprising:

holding means for holding calibration information downloaded from a host device;

generating means for generating calibration information at a predetermined timing; and execution means for comparing a value represented by the calibration information generated by the generating means and a value represented by the calibration information held by the holding means and, when a difference obtained in the comparing exceeds a predetermined value, executing the calibration based on the calibration information generated by the generation means.

In a second aspect of the present invention, there is provided a printing apparatus capable of performing a calibration for a print characteristic, comprising:

holding means for holding calibration information downloaded from a host device;

generating means for generating calibration information at a predetermined timing; and execution means for comparing a value represented by the calibration information generated by the generating means and a value represented by the calibration information held by the holding means, when a difference obtained in the comparing exceeds a predetermined value, urging the host device to download the calibration information and executing the calibration based on the calibration information downloaded from the host device.

In a third aspect of the third aspect of the present invention, there is provided a printing apparatus capable of performing a calibration for a print characteristic, comprising:

holding means for holding calibration information downloaded from a host device;

generating means for generating calibration information at a predetermined timing; and notification means for comparing a value represented by the calibration information generated by the generating means and a value represented by the calibration information held by the holding means and, when a difference obtained in the comparing exceeds a predetermined value, notifying an error.

In a fourth aspect of the present invention, there is provided a printing apparatus capable of performing a calibration for a print characteristic, comprising:

first holding means for holding calibration information downloaded from a host device; and second holding means for generating calibration information at a predetermined timing and holding the generated calibration information.

In a fifth aspect of the present invention, there is provided a calibration control method for a printing apparatus capable of performing a calibration for a print characteristic, the method comprising the steps of:

holding calibration information downloaded from a host device;

generating calibration information at a predetermined timing; and comparing a value represented by the calibration information generated by the step of generating calibration information and a value represented by the calibration information held at the step of holding calibration information and, when a difference obtained in the comparing exceeds a predetermined value, executing the calibration based on the calibration information generated by the step of generating calibration information.

In a sixth aspect of the present invention, there is provided a calibration control method for a printing apparatus capable of performing a calibration for a print characteristic, the method comprising the steps of:

holding calibration information downloaded from a host device;

generating calibration information at a predetermined timing; and comparing a value represented by the calibration information generated by the step of generating calibration information and a value represented by the calibration information held at the step of holding calibration information, when a difference obtained in the comparing exceeds a predetermined value, urging the host device to download the calibration information and executing the calibration based on the calibration information downloaded from the host device.

In a seventh aspect of the present invention, there is provided a calibration control method for a printing apparatus capable of performing a calibration for a print characteristic, the method comprising the steps of:

holding calibration information downloaded from a host device;

generating calibration information at a predetermined timing; and comparing a value represented by the calibration information generated by the step of generating calibration information and a value represented by the calibration information held at the step of holding calibration information and, when a difference obtained in the comparing exceeds a predetermined value, notifying an error.

According to the above structure, comparing the calibration information downloaded from the host device to be held in the printing apparatus with the calibration information generated independently by the printing apparatus at a predetermined timing, for example at when the toner is replenished, is performed. When a difference between respective measured density values for a predetermined input density value, which are obtained as the compared calibration information, exceeds a predetermined value, the calibration information generated independently by the printing apparatus is used for performing calibration. Alternatively, in another configuration, the calibration information downloaded again from the host device can be used to perform calibration. Hence, it is ensured that the calibration performed by the printing apparatus can be always based on the latest, appropriate calibration information. At the same time, the host device can manage the execution of calibration simply by downloading the calibration information.

The above and other objects, features and advantages of the present invention will become more apparent from the following description of embodiments thereof taken in conjunction with the accompanying drawings.

BRIEF DESCRIPTION OF THE DRAWINGS

FIG. 3 is an example of calibration information generated by the printer according to one embodiment of the present invention;

FIG. 5 is an example of the downloaded calibration information to the printer;

DESCRIPTION OF THE PREFERRED EMBODIMENTS

Embodiments of the present invention will be described in detail by referring to the accompanying drawings.

First Embodiment

Figure 1:
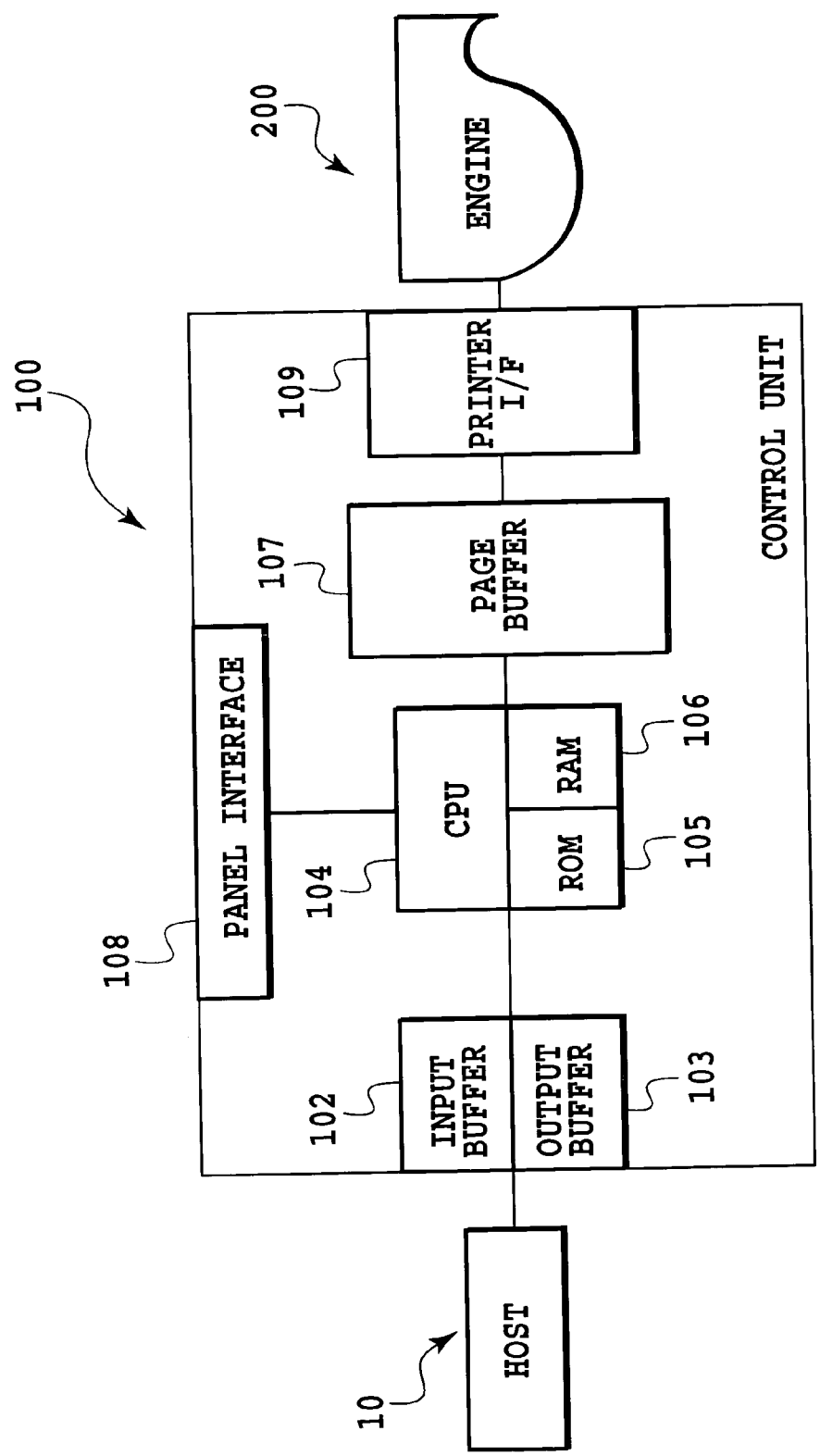
FIG. 1 is a block diagram mainly showing a configuration for control processing performed in the printer according to one embodiment of the present invention.

FIG. 1 is a block diagram showing mainly a control configuration of a laser beam printer according to one embodiment of the present invention. The laser beam printer of this embodiment (also referred to simply as a "printer") includes a control unit 100 and an engine 200 as main components to perform a printing operation based on print information, calibration data or the like supplied from a host computer 10.

In the figure, an input buffer 102 temporarily stores input data from various data sources, such as host computer (also referred to simply as "host") 10, scanner (not shown) and the like, while an output buffer 103 mainly stores output data to be supplied to the host 10.

A CPU 104 executes various controls for an overall operation of the printer, such as image processing performed in the control unit 100 and printing operation of the engine 200. A ROM 105 stores programs, which are described later referring to FIGS. 8, 10 and 11 and are executed by the CPU 104, and font patterns. A RAM 106 is used as a work area for the processing by the CPU 104 and also stores calibration information described later and analysis information and output information. A page buffer 107 stores a print image data that has been obtained by analyzing the print information supplied from the host 10. More specifically, for each of toner colors cyan (C), magenta (M), yellow (Y) and black (Bk) in the engine 200, the page buffer 107 can store for one page and at an amount of plurality of pages the image data, which has been binarized after being subjected to predetermined image processing.

Another element panel interface 108 controls input/output of data to and from an operation panel (not shown) provided in then printer, and a printer interface 109 controls input/output of data to and from the printer engine 200.

Figure 2:
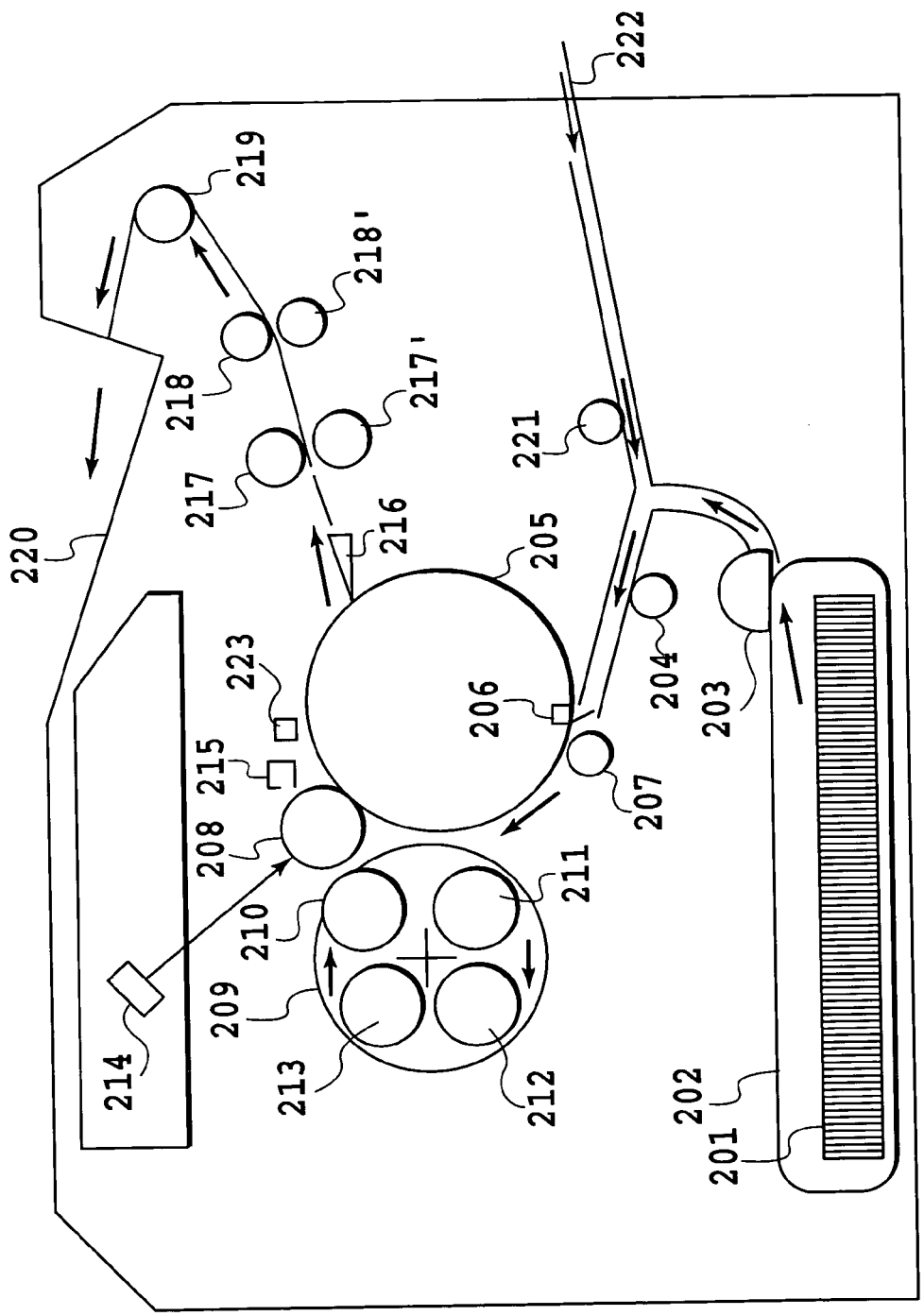
FIG. 2 is a schematic cross section showing a configuration of an engine unit of the printer shown in FIG. 1.

FIG. 2 is a schematic cross section showing detail structure of the engine 200 shown in FIG. 1. The control unit shown in FIG. 1 is provided in a form of a predetermined substrate (not shown) installed in the printer shown in FIG. 2.

In the figure, reference numeral 201 represents a paper or a printing medium, and 202 a paper cassette for holding sheets of paper 201. Reference numeral 203 represents a cassette paper feed clutch which is rotated by a drive mechanism not shown to separate and feed only the top of a plurality of sheets stacked in the paper cassette 202. More specifically, the paper feed clutch 203 has a cam that conveys a front end of the separated sheet to an operative position of a paper feed roller 204. The cam is given one rotation for intermittent feeding of the paper to feed one sheet of the paper. The paper feed roller 204 lightly presses against the paper 201 fed by the paper feed clutch 203 as described above and rotates to further transport the paper toward a transfer drum.

The engine 200 is also arranged to be provided with a manual paper feeding system in addition to the paper feeding system described above. The manual paper feeding system has a paper feeding table 222 and a manual paper feeding clutch 221, so as to allow a user to perform manual feed operation for each sheet at the paper feeding table 222.

The paper fed in this manner is subjected to a predetermined transportation through a printing section, which has a transfer drum 205 and to a printing operation. More specifically, the transfer drum 205 is rotating at a predetermined speed and when a gripper 206 provided on the transfer drum 205 comes to the front end of the paper, it holds the front end of the paper. The holding the paper and rotation of a paper transport roller 207 causes the paper 201 to be wound around the transfer drum 205 and transported. Then, as the paper wounded with the transfer drum 205 is rotated, the following printing operation with the transfer of a toner image is performed.

First, a laser driver 214 turns on/off a semiconductor laser not shown according to dot (binary) data supplied for each toner color from the control unit 100 shown in FIG. 1 to focus a laser beam on a photosensitive drum 208, which is charged by a charger not shown. Thus, the laser beam is scanned over the photosensitive drum 208 in a main scanning direction to form a latent image. At the same time that this scan is performed, the photosensitive drum 208 is rotated in synchronism with a movement of the paper 201 on the transfer drum 205. The scanning of the laser beam and the drum rotation thus performed allow the photosensitive drum 208 to be exposed with the laser beam and one page of latent image to be formed. A developer supporter 209, which holds a Y toner developer 210 for a yellow toner, an M toner developer 211 for a magenta toner, a C toner developer 212 for a cyan toner and a Bk toner developer 213 for a black toner, is driven by a drive mechanism not shown in synchronism with the formation of the latent image to convey the toner developer of a color corresponding to the latent image to be formed to a developing position, where the developer can develop the latent image on the photosensitive drum 208. The latent image on the photosensitive drum 208 is made visible as a toner image by the developer of the corresponding color to the latent image in the developer supporter 209. After this, as the photosensitive drum 208 rotates, the toner image is transferred onto the paper 201 on the transfer drum 205.

The above-described series of operations for transferring an image is sequentially performed for each of the toner colors C, M, Y and Bk. That is, the above operations are performed four times to finally transfer one page of full color toner image onto the paper 201 on the transfer drum 205.

The paper 201 on which the toner image is thus transferred is separated from the transfer drum 205 by a transfer separation claw 216 and the transferred toner image on the paper is heated by a pair of fixing rollers 217, 217' to be fixed. Further, the paper fixed with the toner image is transported by transport rollers 218, 218' and 219 onto a discharge tray 220.

At a part of an area around the transfer drum 205A density sensor 223 is provided. With the density sensor 223, when generating calibration data as described later, densities of toner patch images formed on the transfer drum 205 can be detected. In a printer of this embodiment, when a toner cartridge or the photosensitive drum is replaced or when environmental conditions such as temperature or humidity change, it may occur that an amount of toner transferred to the drum or the paper when performing the printing operation may change. For this reason, when the toner cartridge and the photosensitive drum is exchanged, respectively and when the temperature and the humidity change at respective predetermined values and more, the printer of this embodiment is adapted to automatically form the patch images on the transfer drum 205 so as to generate the calibration data.

FIG. 3 is a diagram showing an example of a relation between density data (gradation values) generated in the printer for outputting a plurality of patches and actual density detected for each of the plurality of the patch by the density sensor 223, which are used for generating calibration data.

As shown in the figure, four gradation values 1E, 78, A0 and FA are selected for each of the Y, M, C and Bk colors as density data for printing the patches. Based on the density data, four kinds of patches are printed for each color. It should be noted that these values are represented in hexadecimal numbers (the following also applies to FIG. 3) and, in decimal notation, indicate value 30, 120, 160 and 250 of the 256 gradation values. FIG. 3 shows densities of four kinds of patches, which are measured by the density sensor 223, for each color. In the case of color Y, for example, the patch printed with the density data 1E has a measured density of 20, the patch with 78 has a measured density of 74, the patch with A0 has a measured density of A0, and the patch with the density data FA has a measured density of FF. In the case of Y shown in FIG. 3, it is seen that the input density data value and the density of toner actually put on the transfer drum in the printer agree in the case of the density data A0, whereas there are variations in other density data. As for M (magenta), the density data 1E results in a measured density of 22, the density data 78 results in 78, the density data A0 results in A5 and the density data FA results in FF. This result shows that there are density areas where an amount of the toner put on the transfer drum is greater than that intended by the input density data value. In such a case, when it is desired to output the density A0, i.e., when the input data value is A0, the calibration is performed on a γ correction table to update the data in the correction table so that the input data value is corrected to be smaller than A0.

Similarly, as for C (cyan), the density data 1E results in a measured density of 22, the density data 78 results in 76, the density data A0 results in A8 and the density data FA results in FF.

This result shows that there is variation in the amount of the toner put on the transfer drum, that is the amount is larger than that intended by the input data value in some areas but smaller in other areas. Further, as for Bk (black), the density data 1E results in a measured density of 22, the density data 78 results in 80, the density data A0 results in A5, and the density data FA results in FF, indicating that the amount of toner tends to be greater than that intended by the input density data value, as similarly to the case of M.

Figure 4:
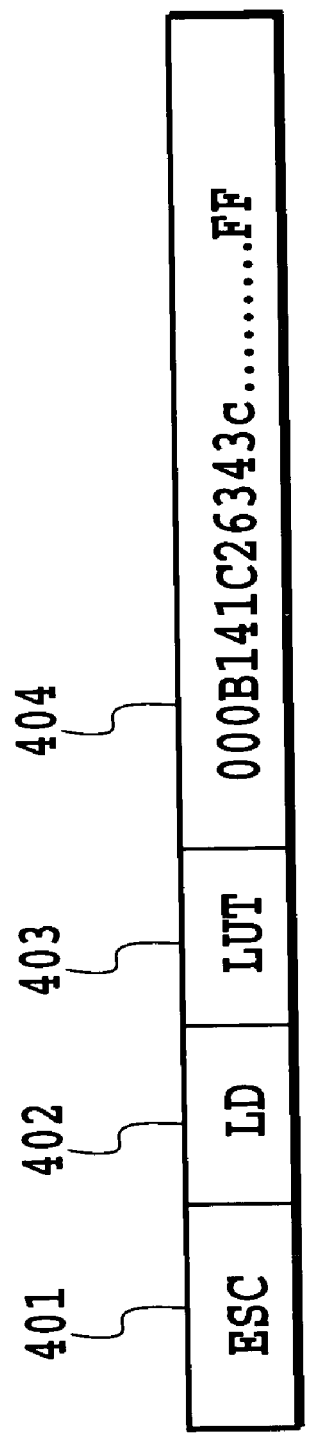
FIG. 4 is an example format of a command for the calibration information downloaded to the printer.
Figure 6:
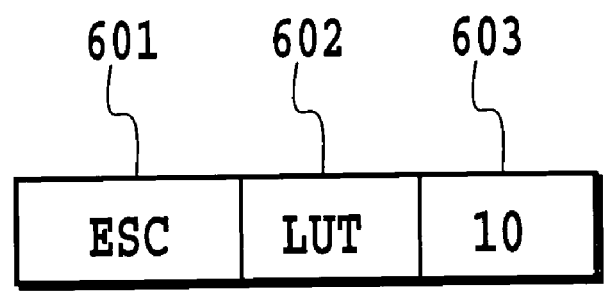
FIG. 6 is an example format of a command that sets a threshold value for a density difference in the printer according to one embodiment of the present invention.

FIGS. 4 to 6 show control data or the like sent from the host 10 to the above-described printer of this embodiment.

FIG. 4 shows one example of an image command specified by the host 10 and is a command for downloading the calibration data generated in the host 10. In FIG. 4, reference numeral 401 represents an ESC code indicating that this command is a control command, 402 is a character row indicating that this command is for downloading information, 403 is a character row indicating that this command is for loading data regarding registering the γ correction table, and 404 represents calibration data used to calibrate the γ correction table. The calibration data, as described later with respect to FIG. 5, is information including 10 stages of input density values (gradation values) from density 0 to density 250 and density obtained by taking measurements for the ten input density values. It is needless to say that the calibration data includes this information for each of the Y, M, C and Bk colors. The calibration data downloaded from the host is obtained by actually printing the patches on the paper and reading them with a scanner. Therefor, the density information under a condition during the actual printing process can be reflected on the calibration data with high fidelity. Moreover, the number of patches as samples can be increased. Because of these advantages, the calibration can be made with high precision.

FIG. 5 shows one example of the calibration data downloaded by the command shown in FIG. 4. As in FIG. 3, FIG. 5 shows a relation between the input density value and the actual toner density measured by a scanner for each toner color. The values in the figure are represented in hexadecimal number, as in FIG. 3.

In this embodiment, as described above, the patches are printed for each of 10 stages of density or for each of input densities of 00, 0A, 14, 1E, . . . , FA and measuring density of these patches is performed. Then, the input density data and the measured density are used as the calibration data. In the case of Y (yellow), for example, the patch with an input density value of 00 has a measured density of 00, the patch with 0A has 0B, the patch with 14 has 14, the patch with 1E has 1C, . . . , and the patch with FA has FF. This result shows that the actually measured densities, which is determined by an amount of toner fixed on the paper, almost match the corresponding input density values. On the other hand, in the case of M (magenta), the input density value of 00 results in a toner density of 00, the input density value of 0A results in 0A, the input density value of 14 results in 16, the input density value of 1E results in 1F, . . . , and the input density value of FA results in FF. These result shows that the amount of toner fixed on the paper is slightly greater than that intended by the input density values. Further, in the case of C (cyan), the input density value of 00 results in a toner density of 00, the input density value of 0A results in 0A, the input density value of 14 results in 16, the input density value of 1E results in 1E, . . . , and the input density value of FA results in FF, showing that the amounts of toner fixed on the paper with respect to some input densities are greater than that intended by the input density values. Further more, in the case of Bk (black), the actual densities are 00, 09, 16, 1F, . . . , and FF for the input density values of 00, 0A, 14, 1E, . . . , and FA, respectively, showing that there are variations in the amount of toner fixed on the paper the input-output.

Since the calibration data obtained in the host device has a greater number of sampling points (patches) than the calibration data generated independently in the printer as explained in FIG. 3 and since the density of the patch actually output on the paper is used, the calibration can be performed with higher precision. Therefore, in a printing system of the embodiment, the downloaded calibration data is normally used to generate the γ correction table. Generating the calibration data in the host is performed basically based on an order of a user for the host apparatus. For example, when the user think that print quality has been degraded or when the user intend to print an image with especially high quality, the user causes the printer, which is subjected to the calibration, to print the patches through the host, and causes the scanner to read the printed patches. Then, the user causes the host to generate the calibration data.

Figure 10:
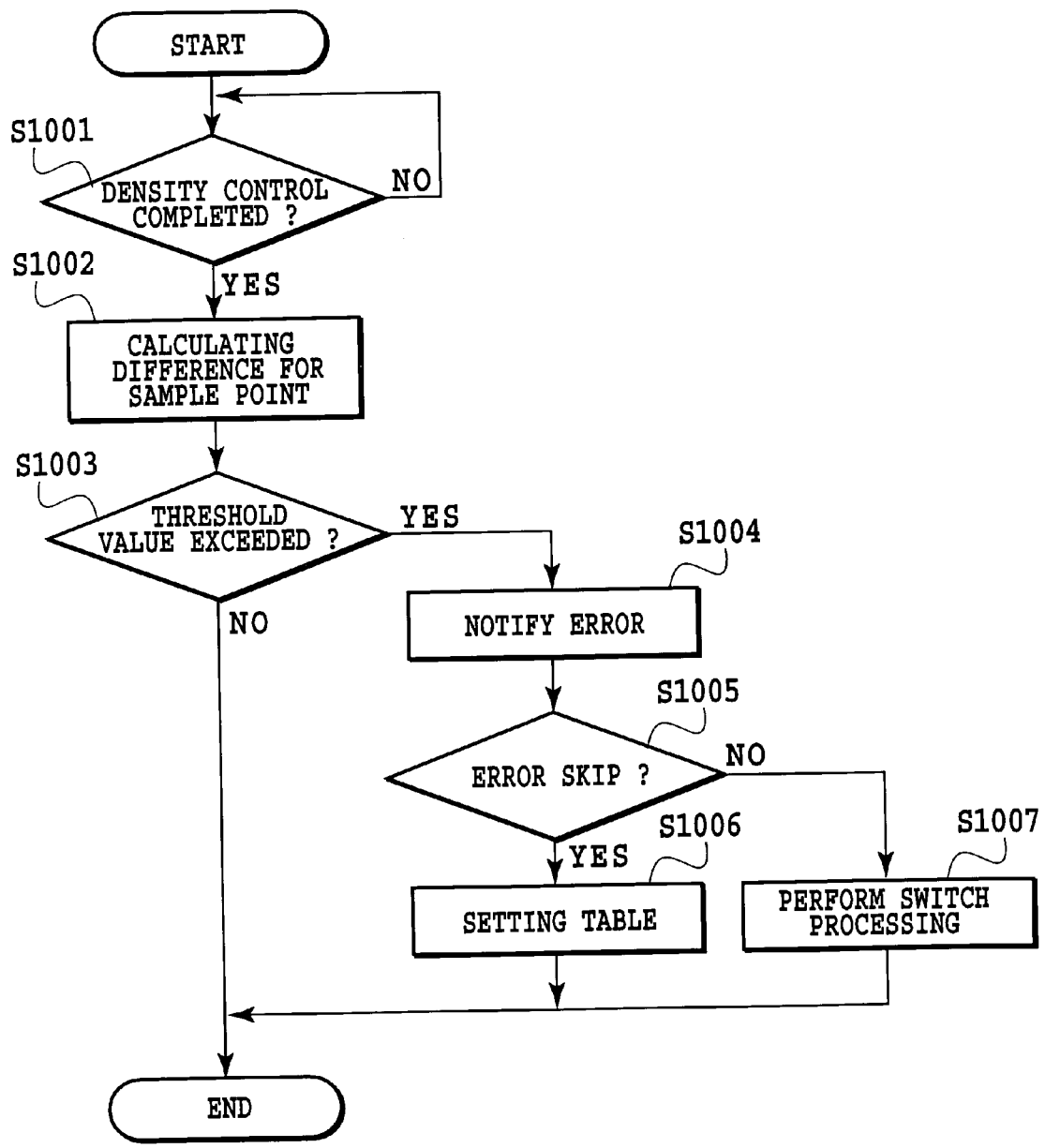
FIG. 10 is a flow chart showing a procedure for density controlling performed by the printer according to a first embodiment of the present invention.

FIG. 6 shows one of the control command sent from the host 10 which, as described later with reference to FIG. 10, represents the command regarding threshold data as a reference used to decide whether the downloaded calibration data should be used or not.

In the figure, reference numeral 601 represents an ESC code indicating that this information is a control command. Reference numeral 602 represents a character row indicating a command for specifying a threshold value to decide whether to validate the downloaded calibration data. Reference numeral 603 represents the threshold value data. The threshold value may previously set for each printer. Alternately, when generating the calibration data, the threshold value may be set by a user by taking a print characteristic of the printer subjected to the calibration into consideration.

Figure 7:
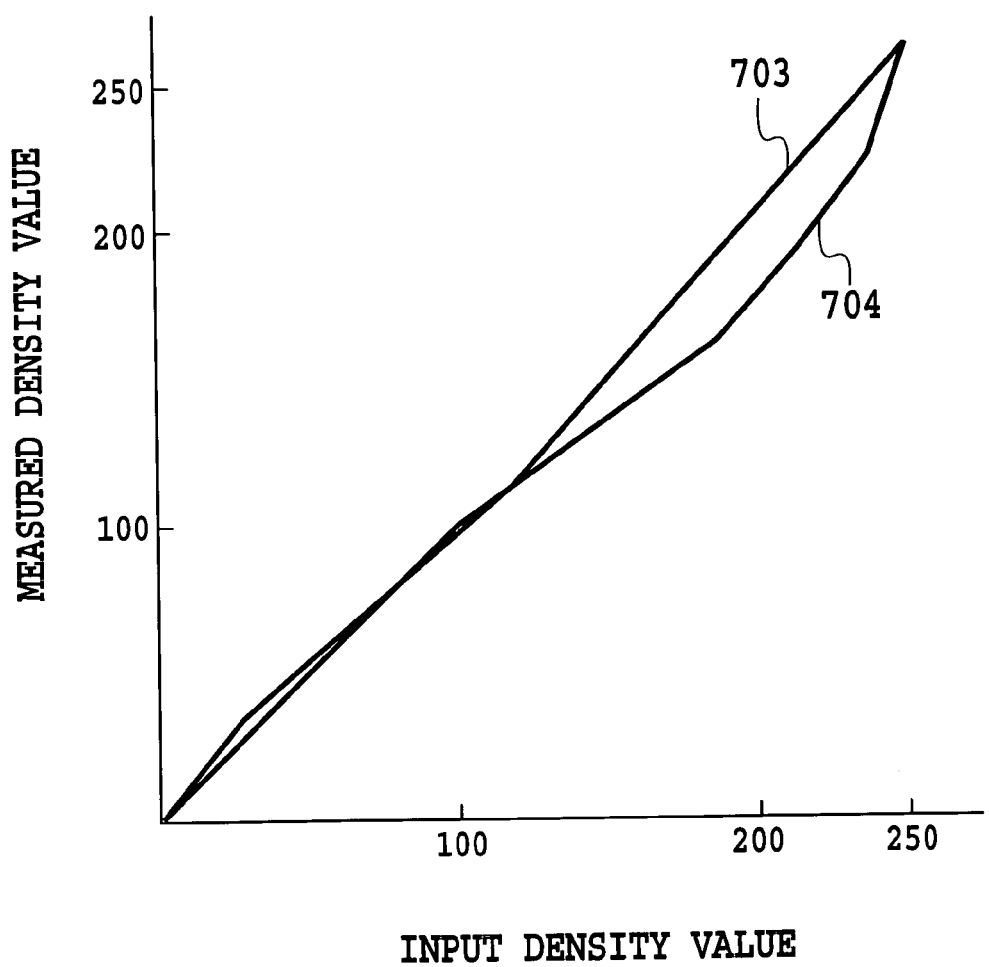
FIG. 7 is a diagram showing an example of relations between an input density value and respective measured values, which are obtained based on the calibration information generated by the printer and the downloaded calibration information, respectively, according to one embodiment of the present invention.

FIG. 7 is a diagram showing a relation between an input density value and a measured density value, which are shown as the calibration data. The figure shows a result obtained by connecting, with a line, respective points given by respective sets of the input density value at a sampling point and the measured density values thereof.

In the figure, reference numeral 703 represents a density relationship indicated by the calibration data shown in FIG. 3, which is generated independently in the printer of this embodiment. Reference numeral 704 represents a density relationship indicated by the calibration data of FIG. 5 loaded from the host 10. It is seen that the two density relationships differ in a region ranging from a medium density to a high density. The example shown represents the result of calculation for Bk and the similar process is taken for other colors C, M and Y.

Figure 9:
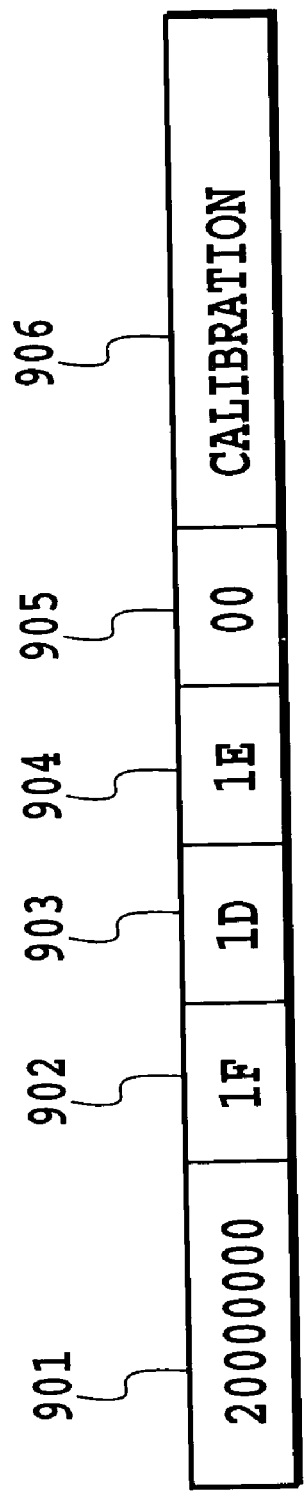
FIG. 9 is an example of a page buffer in the printer.

A process of the calibration, that will be explained with reference to FIG. 9 and subsequent figures, determines respective relationships which are inverse to those shown in FIG. 7 and uses them as update data for the $\gamma$ correction table. These determined relationships are referred as 703A and 704A below. For example, when the density is measured to be higher than the input value, the $\gamma$ correction is made to reduce the input value in accordance with these relationships.

A processing or an operation of the printer based on the control command sent from the host 10 will be explained by referring to the flow chart shown in FIGS. 8A and 8B.

This program is started when power of the printer is turned on. Step S801 checks whether data from the host 10 has already been received at the port and at the same time wait for the data transfer from the host 10. When the data has been received, step S802 checks whether the received data is the control command.

If so, the program proceeds to step S803 where it checks whether the control command calls for downloading the calibration data (registering LUT). More specifically, it is checked whether the identifier of the command is the same as that represented by the character rows 402 and 403 shown in FIG. 4. If so, it is decided that the command is a calibration data download command and step 804 generates a conversion equation explained in FIG. 7, i.e., $\gamma$ correction table data 704A based on the downloaded calibration data.

If the command is not a download command, step S805 checks whether it is a command specifying the threshold value (LUT difference) shown in FIG. 6. That is, a check is made to see whether the identifier is the same as that represented by the character row 602 shown in FIG. 6. When it is decided that the command is an LUT difference registration command, step S806 registers the specified threshold value. When on the other hand it is not an LUT difference registration command, the program proceeds to step S807 where it performs analysis conforming to another command.

When step S802 decides that the received data is not a control command, the received data is taken to be print information, which is then analyzed at step S808. At step S809, a series of image processing is performed on the print data for each of C, M, Y, Bk colors generated at step S808. As one of the image processing, a density conversion ($\gamma$ correction) is performed. The $\gamma$ correction LUT used for the density conversion is the table data 704A or table data 703A, which is determined by processing described later with reference to FIG. 10. In the density conversion, consider a case where the table data 704A is obtained by the calibration based on the calibration data shown in FIG. 5 and the $\gamma$ correction is performed by using the table data 704A, for example, when the print data shows that printing for Y, M and C is performed with the density value of 1E, the value 1E is changed into 1F for Y, into 1D for M and into 1E for C by using the table data 704A.

Next, step S810 writes into a page buffer the print information including density value information generated as described above. FIG. 9 is a diagram showing an example of the page buffer, with reference numeral 901 representing a start address of memory where the video information to be sent to the engine is written, with numerals 902, 903, 904 and 905 representing converted density values of Y, M, C and Bk, respectively, and with numeral 906 representing character row data to be printed with this specified density.

Next, step S811 judges whether one page of data has been generated by checking that one page of plain image is stored into the buffer. When it is found that one page of data has not been generated, the program returns to step S802 where it continues to input data and take the data. When on the other hand it is judged that one page of data has been generated, step S812 outputs the generated page, that is, performs printing an operation. More specifically, as explained by referring mainly to FIG. 2, the paper 201 is fed for example from the paper cassette 202 and at the same time data of each color stored in the page buffer 107 is supplied through the printer interface 109 to the laser driver. This allows the printer to form a latent image on the photosensitive drum 208, develop the image with toners, and transfer the developed image onto the paper 201. Finally, the printed paper is discharged onto the paper discharge tray. At step S813 it is checked whether there is data sent from the host 10 and, when all data has been processed, this processing is ended. When not, the program returns to step S802 where it continues processing.

FIG. 10 is a flow chart showing processing for generating a calibration table (hereinafter also referred as density control) performed by the printer of this embodiment.

The embodiment of the present invention as described above has both the calibration performed mainly by the host device and the calibration independently performed by the printer.

The calibration performed independently in the printer is that the density control is automatically executed when a consumable such as the toner or the photosensitive drum is replaced and when temperature and humidity changes by more than respective predetermined amounts. More specifically, the density control is as explained in FIG. 3 performed as follows. The plurality of patches are formed with toner on the transfer drum for a plurality of gradation values and these patches are read by the sensor to generate the calibration data. Then, based on the calibration data the calibration table is generated.

When the print system thus has these two manners of calibration, it may be relatively difficult to manage switching timing between the two calibration data, which are the host-based calibration data and the printer-based calibration data, so as to determine as to which calibration data is used for generating the calibration table.

According to this embodiment, therefore, the switching timing is managed by a simple control as illustrated in FIG. 10.

This program is started in associated with that the calibration independently performed in the printer is performed. More specifically, step S1001 waits for the density control, that is, the generation of the calibration table to end. When it is ended, step S1002 calculates for each color a difference between a value measured in the density control (a value in the calibration data generated independently in the printer) and a measured value in the calibration data downloaded from the host 10 for each of the four sample points in FIG. 3, i.e., for each of the input density values of 1E, 78, A0 and FA. In the case that the calculations are made for the input density value (sample point) of 1E, for example, when the density relationships based on the data obtained before the density control is performed is that shown in FIGS. 3 and 5, the density difference becomes less than a value 10 for each colors and therefor does not exceed the threshold value. However, when the measured density values in the calibration data newly obtained by the density control are 29 for Y, 22 for M, 24 for C and 24 for Bk, respectively, the density difference is 13 (in decimal number) for Y, 3 for M, 6 for C and 5 for Bk. The density difference for Y is in excess of the threshold value of 10. In this embodiment, if the threshold value is exceeded for any one of the sample points or for any one of the colors, step S1003 decides that the threshold value is exceeded.

If at step S1003 it is judged that the difference calculated at the step S1002 is in excess of the threshold value specified by the difference registration command explained in FIG. 6 (Y is 13, which exceeds the threshold value of 10 specified by the command of FIG. 6), step S1004 notifies a user for the printer of an error on an operation panel through the panel interface 108 (see FIG. 1). Then step S1005 waits for an operator's an operation for an instruction. If an error skip is specified by the user's operation, step S1006 switches the γ correction table to that of the table data 703A generated by the density control. When the error skip is not specified on the other hand, step S1007 performs switch processing (resetting, canceling, etc.) according to the panel operation. When step S1003 judges that the threshold value is not exceeded, the content of the γ correction table based on the downloaded calibration is taken to be valid and the processing is terminated without performing the table data switching.

According to the above processing, the γ correction table calibrated based on the calibration information downloaded from the host is basically used. However, when there is a difference of more than a predetermined threshold value between the calibration information obtained independently in the printer at a time when a part of the printer is replaced or the like, and the downloaded calibration information, the calibration information generated in the printer is used. This ensures that the γ correction, which is appropriately calibrated, is always performed. At the same time, the host or a user for the host can manage the calibration on the printer simply by downloading the calibration information and the control command associated with the threshold value to the printer, thus making the calibration management simple and easy.

Although the threshold value used when comparing the measured value determined by the printer and the measured value downloaded from the host has been described to be constant for all sample points and for all colors, the present invention is not limited to this application and the threshold value may be changed from one sample point or color to another. For example, for a sample point in a low-density area where the density difference can be relatively easily recognized by human eye, the threshold may be set smaller to allow the calibration to be performed with higher precision in that low-density area. In such case, the threshold value can be specified for each sample point by the command shown in FIG. 6.

Second Embodiment

Figure 11:
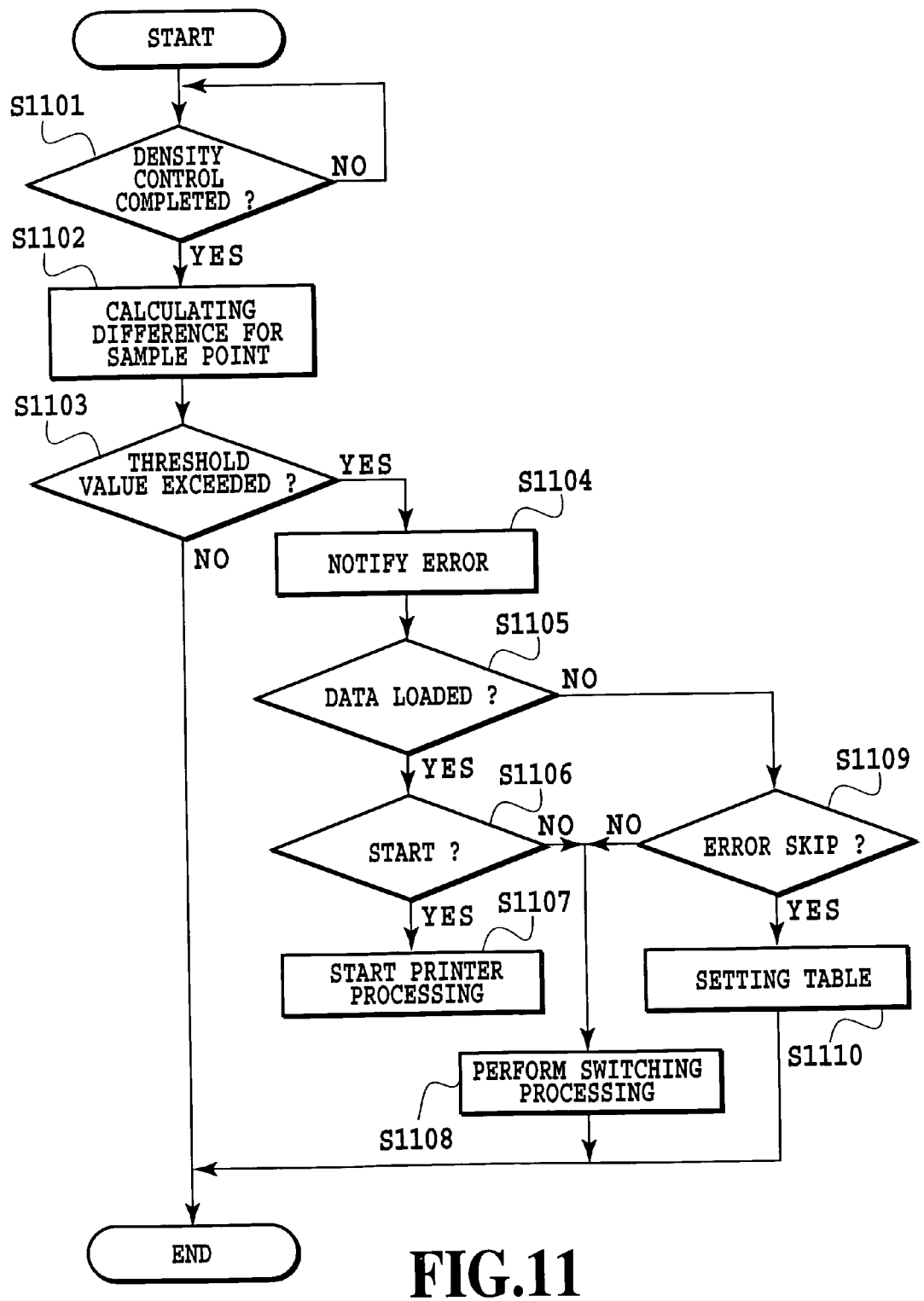
FIG. 11 is a flow chart showing a procedure for density controlling performed by the printer according to a second embodiment of the present invention.

In the above embodiment, when the density difference between the calibration information obtained by the density control in the printer and the calibration information downloaded from the host exceeds a specified threshold value, an error message is displayed on the operation panel of the printer. In this embodiment, the error is notified to the host to download new calibration information from the host to update the calibration information. FIG. 11 is a flow chart showing the procedure of this processing.

The processing also is started in associated with the density control in the printer, as with the processing shown in FIG. 10. Steps S1101–S1104 are similar to the steps S1001–S1004 shown in FIG. 10 and therefor their detail explanations are omitted. When step S1103 judges that the threshold value is exceeded, step S1104 informs an error to the host. Then, step S1105 checks whether new calibration data has been downloaded from the host in response to the error notification. When it is judged that new calibration data has been downloaded, a density conversion (γ correction) table is generated and registered according to the processing shown in FIGS. 8A and 8B, particularly step S804, based on the downloaded data.

Figure 8B:
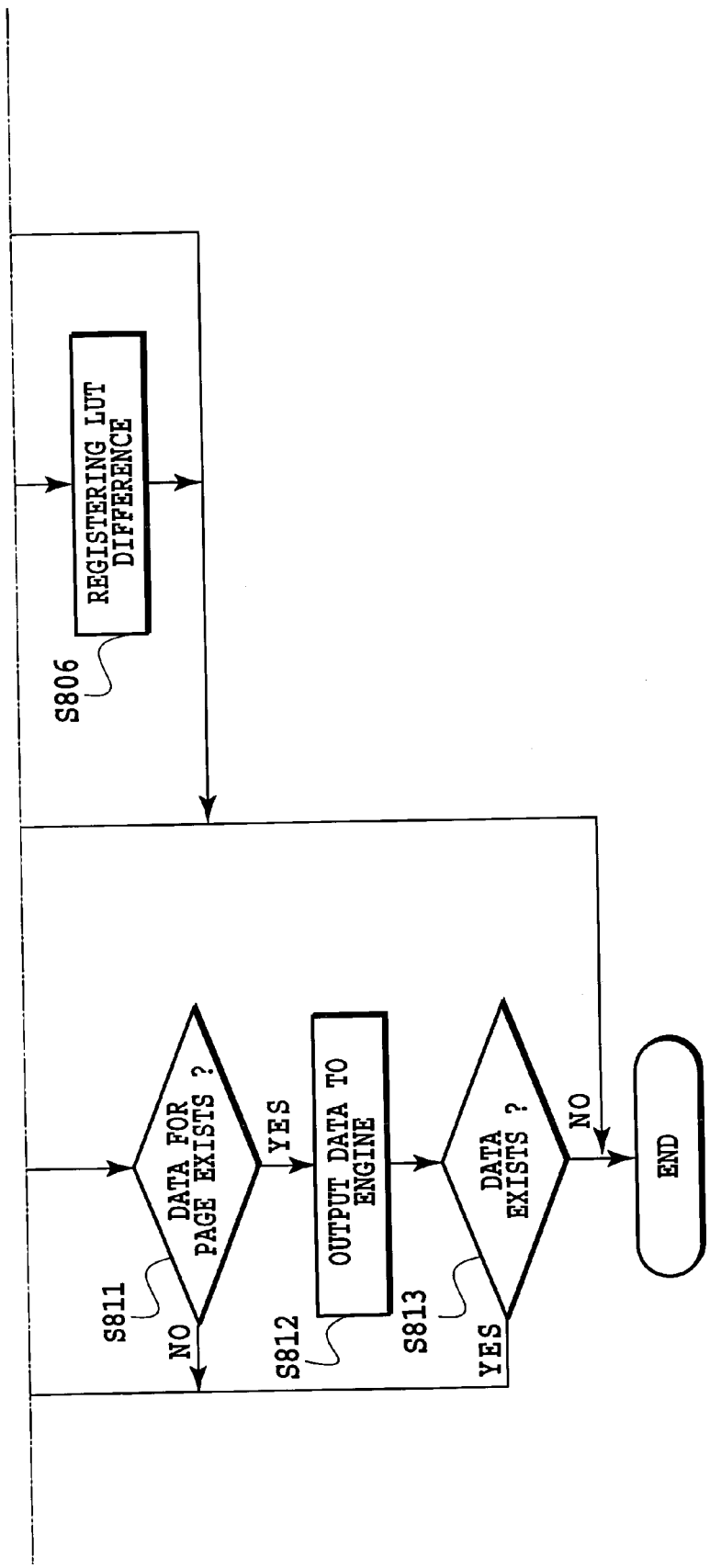
FIG. 8 is a diagram showing a relationship between FIGS. 8A and 8B, FIGS. 8A and 8B are flow charts showing a procedure executed by the printer according to one embodiment of the present invention.

When the calibration information is thus updated, a user or an operator for the printer now can start the processing of the printer shown in FIGS. 8A and 8B. Therefor, step S1106 checks if the key for starting the printer processing is operated. When the start is instructed, step S1107 initiates the printer processing shown in FIGS. 8A and 8B. When it is judged that new calibration information is not downloaded from the host at step S1105, step S1109 checks whether there is an error skip request from the user or the operator for the host. When an error skip is requested, step S1110 replaces the content of the γ correction table with the table data 703A obtained by the density control.

When the instruction from the operator is neither start nor error skip, S1108 performs the switch processing (resetting, canceling, etc.) according to an operation on the operation panel.

More specifically, the above-described error notification from the printer to the host cannot be cancelled unless the operator for the printer operates the predetermined key operation explained above on the operation panel. That is, when the operator recognizes that the calibration mainly by the host is performed and from the host new calibration data is loaded to the printer, the operator makes the key operations for causing the printer to start print processing shown in FIGS. 8A and 8B. These operations allow the processing of steps S1105, S1106 and S1107 shown in FIG. 11 to be caused. On the other hand, when the new calibration data is not loaded from the host, the operator makes the key operations for error skip and the like, and in response to these operations respective corresponding processing of steps S1105, S1109, S1108 and S1110 are caused.

It should be noted that the operations performed by the operator with respect to the above-described processing of step S1105 and succeeding steps may be adapted to be performed by the user on the host.

Further, in the first and second embodiments, the density control associated with the processing of FIGS. 10 and 11 has been described to be started by the replacement of the photosensitive drum or toner or by a change in temperature. The density control may for example be initiated each time a predetermined number of sheets has been printed in the printer.

Further more, the user may manually choose the calibration data to be used in the printer according to the error notification performed in the second embodiment.

Other Embodiments

The present invention may be applied to a system consisting of a plurality of devices (such as a host computer, an interface device, a reader and a printer) or to single device (such as a copying machine and a facsimile).

The present invention also includes a configuration in which a computer in an apparatus or system, which is connected with a variety of devices so as to realize functions of the foregoing examples shown in FIGS. 8, 10 and 11, is loaded with a program code of software and in which these devices are operated according to the program stored in the computer (CPU or MPU).

In this case, the software program code itself realizes the functions of these examples. The program code and a means for loading the program code to the computer, such as a storage medium containing a program code, constitute the present invention.

The storage media for storing the program code include floppy disk, hard disk, optical disk, magneto-optical disk, CD-ROM, magnetic tape, nonvolatile memory card and ROM.

The program code is included in the present invention not only when the functions of the aforementioned examples are realized by executing the program code loaded into the computer, but also when these functions are realized by the program code in cooperation with an OS (operating system) or application software running on the computer.

It is needless to say that the present invention further includes a configuration in which the program code is stored in a memory mounted on a computer's function extension board or a function extension unit connected to the computer and the CPU in the function extension board or unit executes a part or all of the actual processing according to the instructions of the program code to realize the functions of the preceding examples.

As can be seen from the foregoing description, with the embodiments of the present invention it is possible to provide a calibration system that incorporates respective advantages of both the calibration performed mainly by the host and the calibration independently performed by the printer.

Further, the present invention allows for simple and easy management of the calibrations.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A printing apparatus capable of performing a calibration for a print characteristic, comprising:
holding means for holding calibration information downloaded from a host device;
generating means for generating calibration information at a predetermined timing; and
execution means for comparing a value represented by the calibration information generated by said generating means and a value represented by the calibration information held by said holding means and, when a difference obtained in said comparing exceeds a predetermined value, executing the calibration based on the calibration information generated by said generation means.

2. A printing apparatus capable of performing a calibration for a print characteristic, comprising:
holding means for holding calibration information downloaded from a host device;
generating means for generating calibration information at a predetermined timing; and
execution means for comparing a value represented by the calibration information generated by said generating means and a value represented by the calibration information held by said holding means, when a difference obtained in said comparing exceeds a predetermined value, urging the host device to download the calibration information and executing the calibration based on the calibration information downloaded from the host device.

3. A printing apparatus as claimed in claim 1 or 2, wherein data for the predetermined value is data specified by the host device.

4. A printing apparatus as claimed in claim 1 or 2, wherein when the difference is equal to or smaller than the predetermined value, said execution means executes the calibration based on the calibration information held by said holding means.

5. A printing apparatus as claimed in claim 1 or 2, wherein when the difference exceeds the predetermined value, said execution means notifies an error.

6. A printing apparatus as claimed in claim 5, wherein said execution means, when instruction to skip the error notification is made, executes the calibration based on the calibration information generated by said generating means.

7. A printing apparatus capable of performing a calibration for a print characteristic, comprising:
holding means for holding calibration information downloaded from a host device;
generating means for generating calibration information at a predetermined timing; and
notification means for comparing a value represented by the calibration information generated by said generating means and a value represented by the calibration information held by said holding means and, when a difference obtained in said comparing exceeds a predetermined value, notifying an error.

8. A printing apparatus as claimed in claim 7, wherein said execution means performs the comparison on a plurality of values represented by the calibration information and the predetermined value can be differentiated from one comparison to another.

9. A calibration control method for a printing apparatus capable of performing a calibration for a print characteristic, said method comprising the steps of:
holding calibration information downloaded from a host device;
generating calibration information at a predetermined timing; and
comparing a value represented by the calibration information generated by said step of generating calibration information and a value represented by the calibration information held at said step of holding calibration information and, when a difference obtained in said comparing exceeds a predetermined value, executing the calibration based on the calibration information generated by said step of generating calibration information.

10. A calibration control method for a printing apparatus capable of performing a calibration for a print characteristic, said method comprising the steps of:
  holding calibration information downloaded from a host device;
  generating calibration information at a predetermined timing; and
  comparing a value represented by the calibration information generated by said step of generating calibration information and a value represented by the calibration information held at said step of holding calibration information, when a difference obtained in said comparing exceeds a predetermined value, urging the host device to download the calibration information and executing the calibration based on the calibration information downloaded from the host device.

11. A calibration control method as claimed in claim 9 or 11, wherein data for the predetermined value is data specified by the host device.

12. A calibration control method as claimed in claim 9 or 10, wherein when the difference is equal to or smaller than the predetermined value, said execution step executes the calibration based on the calibration information held at said step of holding calibration information.

13. A calibration control method as claimed in claim 9 or 10, wherein when the difference exceeds the predetermined value, said execution step notifies an error.

14. A calibration control method as claimed in claim 13, wherein said execution step, when instruction to skip the error notification is made, executes the calibration based on the calibration information generated by said generating step.

15. A calibration control method as claimed in claim 9 or 10, wherein said execution step performs the comparison on a plurality of values represented by the calibration information and the predetermined value can be differentiated from one comparison to another.

16. A calibration control method for a printing apparatus capable of performing a calibration for a print characteristic, said method comprising the steps of:
  holding calibration information downloaded from a host device;
  generating calibration information at a predetermined timing; and
  comparing a value represented by the calibration information generated by said step of generating calibration information and a value represented by the calibration information held at said step of holding calibration information and, when a difference obtained in said comparing exceeds a predetermined value, notifying an error.

17. A computer readable medium storing a program which is executable by an information processing apparatus, said program comprising
  calibration control processing for a printing apparatus capable of performing a calibration for a print characteristic, said calibration control processing including the steps of:
  holding calibration information downloaded from a host device;
  generating calibration information at a predetermined timing; and
  comparing a value represented by the calibration information generated by said step of generating calibration information and a value represented by the calibration information held at said step of holding calibration information and, when a difference obtained in said comparing exceeds a predetermined value, executing the calibration based on the calibration information generated by said step of generating calibration information.

18. A computer readable medium storing a program which is executable by an information processing apparatus, said program comprising
  calibration control processing for a printing apparatus capable of performing a calibration for a print characteristic, said calibration control processing including the steps of:
  holding calibration information downloaded from a host device;
  generating calibration information at a predetermined timing; and
  comparing a value represented by the calibration information generated by said step of generating calibration information and a value represented by the calibration information held at said step of holding calibration information, when a difference obtained in said comparing exceeds a predetermined value, urging the host device to download the calibration information and executing the calibration based on the calibration information downloaded from the host device.

19. A printing apparatus comprising:
  first holding means for holding calibration information received from a computer; and
  second holding means for holding calibration information generated in said printing apparatus,
  wherein one of the calibration information held by said first holding means and the calibration information held by said second holding means is selected based on a difference between the calibration information held by said first holding means and the calibration information held by said second holding means to be used for correcting an input image.

20. A printing apparatus according to claim 19, wherein the calibration information held by said second holding means is generated in response to a change in a condition of said printing apparatus.

21. A printing apparatus according to claim 19, wherein the calibration information held by said first holding means is obtained by printing a group of patches on a printing medium and performing measurements of the group of patches.

22. A printing apparatus according to claim 19, wherein the calibration information held by said first holding means has a higher accuracy than the calibrating information held by said second holding means.

23. A computer readable medium storing a program which is executable by an information processing apparatus, said program comprising
  a calibration control method for a printing apparatus capable of performing a calibration for a print characteristic, said method comprising the steps of:
  holding calibration information downloaded from a host device;
  generating calibration information at a predetermined tiring; and
  comparing a value represented by the calibration information generated by said step of generating calibration information and a value represented by the calibration information held at said step of holding calibration information and, when a difference obtained in said comparing exceeds a predetermined value, notifying an error.

* * * * *

UNITED STATES PATENT AND TRADEMARK OFFICE
CERTIFICATE OF CORRECTION

PATENT NO. : 6,963,424 B1
DATED : November 8, 2005
INVENTOR(S) : Yuichi Higuchi

It is certified that error appears in the above-identified patent and that said Letters Patent is hereby corrected as shown below:

Column 3,
Line 1, "of the third" should be deleted.

Column 5,
Line 34, "then" should read -- the --.

Column 9,
Line 21, "referred" should read -- referred to --.

Column 11,
Line 8, "colors" should read -- color --.

Column 15,
Line 17, "11," should read -- 10, --.

Column 16,
Line 58, "tiring;" should read -- timing --.

Signed and Sealed this

Eleventh Day of April, 2006

JON W. DUDAS
*Director of the United States Patent and Trademark Office*